United States Patent
Carrasco et al.

(10) Patent No.: US 12,254,288 B1
(45) Date of Patent: Mar. 18, 2025

(54) SYSTEMS AND METHODS FOR SCALABLE RANDOMIZED SELECTION WITH ENFORCED PROPORTIONALITY ACROSS DISTRIBUTED SYSTEMS

(71) Applicant: Synchrony Bank, Stamford, CT (US)

(72) Inventors: Richard Carrasco, Stamford, CT (US); David Chau, Stamford, CT (US); Nitish Asgekar, Stamford, CT (US)

(73) Assignee: Synchrony Bank, Stamford, CT (US)

( * ) Notice: Subject to any disclaimer, the term of this patent is extended or adjusted under 35 U.S.C. 154(b) by 0 days.

(21) Appl. No.: 18/757,749

(22) Filed: Jun. 28, 2024

Related U.S. Application Data

(60) Provisional application No. 63/648,267, filed on May 16, 2024.

(51) Int. Cl.
G06F 17/30 (2006.01)
G06F 7/58 (2006.01)

(52) U.S. Cl.
CPC .................. G06F 7/588 (2013.01)

(58) Field of Classification Search
CPC ........ G06F 16/13; G06F 16/24; G06F 16/156; G06F 3/1297; G06N 3/00; G06N 5/00; G05B 13/00; H03M 7/30; H04N 9/8042; G06T 9/00
See application file for complete search history.

(56) References Cited

U.S. PATENT DOCUMENTS

| | | | | |
|---|---|---|---|---|
| 3,719,885 A * | 3/1973 | Carpenter | ........ | G01R 31/31813 714/739 |
| 3,774,206 A * | 11/1973 | Rauch | .......... | G01S 13/325 342/120 |
| 4,183,088 A * | 1/1980 | Simmons | ............... | H03K 3/84 708/250 |
| 6,438,106 B1 * | 8/2002 | Pillar | ............. | H04L 12/5602 370/395.42 |
| 6,594,694 B1 * | 7/2003 | Najork | ............... | G06F 16/954 709/227 |
| 6,628,786 B1 * | 9/2003 | Dole | ................ | H04L 9/0891 380/263 |

(Continued)

OTHER PUBLICATIONS

International Search Report and Written Opinion mailed Oct. 10, 2024 in International Application PCT/US2024/035949.

(Continued)

*Primary Examiner* — Hung D Le
(74) *Attorney, Agent, or Firm* — Polsinelli LLP

(57) ABSTRACT

Data selection systems and techniques are described. For instance, a system receives a data set with a plurality of data elements. The system generates a plurality of random values. The system generates a ranking of the plurality of random values. The system selects a subset of the plurality of data elements based on a comparison between the ranking and a predetermined threshold. The predetermined threshold is based on a predetermined proportion of the plurality of data elements to be included in the subset. The system outputs a randomization scheme that includes the ranking and the predetermined proportion, wherein a second selection of a second subset of the plurality of data elements is based on the randomization scheme. The system output an indication of the subset and the second subset.

30 Claims, 10 Drawing Sheets

(56) References Cited

U.S. PATENT DOCUMENTS

| | | | | |
|---|---|---|---|---|
| 6,678,853 B1* | 1/2004 | Brummel | ............... | G06F 7/58 |
| | | | | 714/739 |
| 2003/0006557 A1* | 1/2003 | Busch | ............... | A63F 3/00643 |
| | | | | 273/292 |
| 2005/0137970 A1* | 6/2005 | Houle | ............... | G06Q 20/10 |
| | | | | 705/39 |
| 2007/0111781 A1* | 5/2007 | Moshal | ............... | G07F 17/32 |
| | | | | 463/17 |
| 2008/0059590 A1* | 3/2008 | Sarafijanovic | ........ | H04L 51/212 |
| | | | | 709/206 |
| 2010/0242061 A1* | 9/2010 | Levitan | ............... | H04H 60/76 |
| | | | | 725/19 |
| 2010/0332575 A1* | 12/2010 | Kanter | ............... | G06F 7/588 |
| | | | | 708/255 |
| 2012/0134491 A1* | 5/2012 | Liu | ............... | H04L 9/0869 |
| | | | | 380/28 |
| 2014/0281762 A1* | 9/2014 | Norrie | ............... | H03M 13/3905 |
| | | | | 714/703 |
| 2020/0327778 A1* | 10/2020 | Chesworth | ............ | G07C 15/006 |
| 2021/0406701 A1* | 12/2021 | Wang | ............... | G06N 20/00 |
| 2022/0291902 A1 | 9/2022 | Todaro et al. | | |
| 2022/0308839 A1* | 9/2022 | Luo | ............... | G06F 7/588 |
| 2024/0080884 A1* | 3/2024 | Ma | ............... | H04W 74/002 |
| 2024/0241696 A1* | 7/2024 | Wei | ............... | G06F 7/588 |
| 2024/0267955 A1* | 8/2024 | Jung | ............... | H04W 74/006 |

OTHER PUBLICATIONS

Haris Aziz et al., "Random Rank: The One and Only Strategyproof and Proportionally Fair Randomized Facility Location Mechanism," 36th Conference on Neural Information Processing Systems (NeurIPS 2022), pp. 1-12, Oct. 31, 2022.

\* cited by examiner

| Data Elements 305 | Random Values 310 | Selections 315 |
|---|---|---|
| 1 | 76 | A |
| 2 | 23 | A |
| 3 | 88 | B |
| 4 | 49 | A |
| 5 | 29 | A |
| 6 | 97 | B |
| 7 | 3 | A |
| 8 | 54 | A |
| 9 | 12 | A |
| 10 | 92 | B |

Desired Proportions 330:
80% in Group A
20% in Group B

≠

Actual Proportions 335:
70% in Group A
30% in Group B
Drift 340: 10%

FIG. 3

| Data Elements 405 | Random Values 410 | Rankings 415 | Selections 420 |
|---|---|---|---|
| 1 | 65 | 6 | A |
| 2 | 24 | 4 | A |
| 3 | 73 | 7 | A |
| 4 | 8 | 1 | A |
| 5 | 35 | 5 | A |
| 6 | 97 | 10 | B |
| 7 | 82 | 8 | A |
| 8 | 13 | 2 | A |
| 9 | 17 | 3 | A |
| 10 | 89 | 9 | B |

SYSTEMS AND METHODS FOR SCALABLE RANDOMIZED SELECTION WITH ENFORCED PROPORTIONALITY ACROSS DISTRIBUTED SYSTEMS

CROSS-REFERENCE TO RELATED APPLICATIONS

The present invention claims the priority benefit of U.S. provisional patent application No. 63/648,267 filed May 16, 2024 and titled "Systems and Methods for Scalable Randomized Selection With Enforced Proportionality Across Distributed Systems," the disclosure of which is incorporated by reference herein.

FIELD

This disclosure is related to scalable randomized selection with enforced proportionality. More specifically, this disclosure relates to systems and methods of generating and/or customizing a randomized selection that enforces a desired proportion (e.g., an exact percentage or ratio of elements to be selected), is efficient, is process-agnostic, is access-agnostic, is able to account for possible drift in the proportion over time, and/or is scalable across multiple computing devices in a distributed system.

BACKGROUND

Random number generation (RNG) can be used by a computing system to generate a random number or random sequence of characters. RNG can be used for cryptography, statistical sampling, artificial intelligence, machine learning, distributed ledgers, and other technologies. A random number generator that performs RNG can be implemented in hardware and/or software.

BRIEF SUMMARY

Systems and techniques are described for scalable data selection according to an enforced randomization scheme. In some examples, a system receives a data set with a plurality of data elements. The system generates a plurality of random values. The system generates a ranking of the plurality of random values. The system selects a subset of the plurality of data elements based on a comparison between the ranking and a predetermined threshold. The predetermined threshold is based on a predetermined proportion of the plurality of data elements to be included in the subset. The system outputs a randomization scheme that includes the ranking and the predetermined proportion, wherein a second selection of a second subset of the plurality of data elements is based on the randomization scheme. The system output an indication of the subset and the second subset.

According to at least one example, a method is provided for scalable data selection according to an enforced randomization scheme. The method includes: receiving a dataset with a plurality of data elements; generating a plurality of random values; generating a ranking of the plurality of random values; selecting a subset of the plurality of data elements based on a comparison between the ranking and a predetermined threshold, wherein the predetermined threshold is based on a predetermined proportion of the plurality of data elements to be included in the subset; outputting a randomization scheme that includes the ranking and the predetermined proportion, wherein a second selection of a second subset of the plurality of data elements is based on the randomization scheme; and outputting an indication of the subset and the second subset.

In another example, an apparatus for scalable data selection according to an enforced randomization scheme is provided that includes at least one memory and at least one processor coupled to the at least one memory. The at least one processor is configured to: receive a dataset with a plurality of data elements; generate a plurality of random values; generate a ranking of the plurality of random values; select a subset of the plurality of data elements based on a comparison between the ranking and a predetermined threshold, wherein the predetermined threshold is based on a predetermined proportion of the plurality of data elements to be included in the subset; output a randomization scheme that includes the ranking and the predetermined proportion, wherein a second selection of a second subset of the plurality of data elements is based on the randomization scheme; and output an indication of the subset and the second subset.

In another example, a non-transitory computer-readable medium is provided that has stored thereon instructions that, when executed by one or more processors, cause the one or more processors to: receive a dataset with a plurality of data elements; generate a plurality of random values; generate a ranking of the plurality of random values; select a subset of the plurality of data elements based on a comparison between the ranking and a predetermined threshold, wherein the predetermined threshold is based on a predetermined proportion of the plurality of data elements to be included in the subset; output a randomization scheme that includes the ranking and the predetermined proportion, wherein a second selection of a second subset of the plurality of data elements is based on the randomization scheme; and output an indication of the subset and the second subset.

In another example, an apparatus for scalable data selection according to an enforced randomization scheme is provided. The apparatus includes: means for receiving a dataset with a plurality of data elements; means for generating a plurality of random values; means for generating a ranking of the plurality of random values; means for selecting a subset of the plurality of data elements based on a comparison between the ranking and a predetermined threshold, wherein the predetermined threshold is based on a predetermined proportion of the plurality of data elements to be included in the subset; means for outputting a randomization scheme that includes the ranking and the predetermined proportion, wherein a second selection of a second subset of the plurality of data elements is based on the randomization scheme; and means for outputting an indication of the subset and the second subset.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures:

FIG. 3 is a table diagram illustrating a randomized selection based on comparison of random values to a threshold, in accordance with some examples;

DETAILED DESCRIPTION

Figure 1:
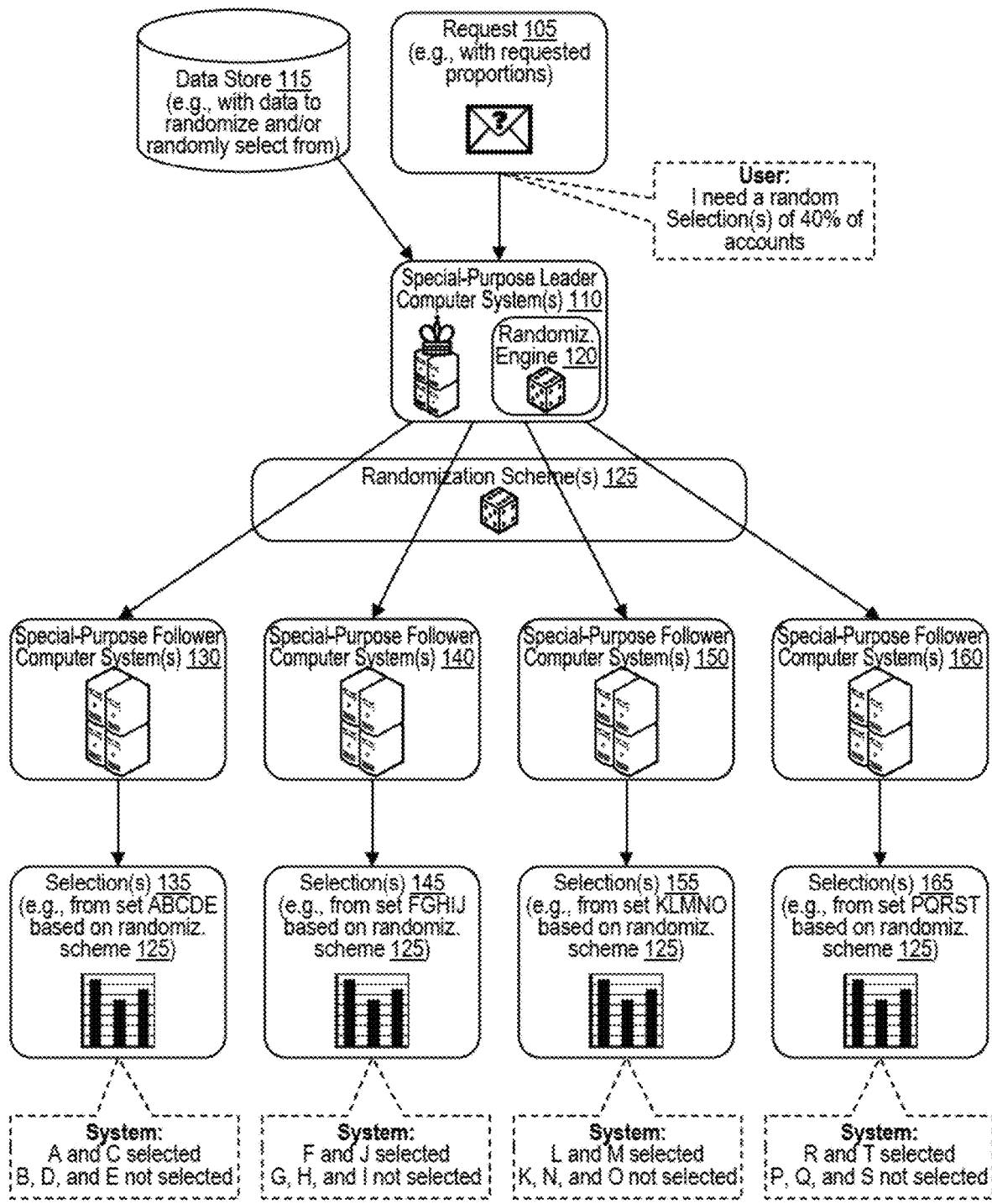
FIG. 1 is a block diagram illustrating an example architecture of a selection system for performing a randomized selection scalably across a distributed system, using a randomization scheme to enforce a predetermined selection proportion, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

Random number generation (RNG) can be used by a computing system to generate a random number or random sequence of characters. RNG can be used for cryptography, statistical sampling, artificial intelligence, machine learning, distributed ledgers, and other technologies. A random number generator that performs RNG can be implemented in hardware and/or software.

RNG can be used to randomly select a subset of a data set. For instance, RNG can be used to generate a respective random value corresponding to each data element in a data set. The random values can be compared to a threshold, and a system can select the subset of the data set for which the included data elements have corresponding random values that are on a specific side of the threshold (e.g., less than the threshold or greater than the threshold). For instance, to select approximately 25% of the dataset, RNG can be used to generate random values between 0 and 100 for each data element of the dataset, and any data elements whose corresponding random values are less than 25 are selected, while any data elements whose corresponding random values are greater than 25 are not selected. However, one technical problem is that randomly selecting data elements in this way does not guarantee that the desired proportion is enforced. For instance, if a user wants to select 25% of a dataset, selection using a random value and a threshold should select approximately 25% of the dataset, but is less likely to select exactly 25% of the dataset. Thus, this form of randomized selection can be inappropriate for applications in which an exact proportion of a dataset (e.g., 25% of the dataset) is to be selected.

Systems and techniques are described for data selection. For instance, a system receives a data set with a plurality of data elements. The system generates a plurality of random values. The system generates a ranking of the plurality of random values. The system selects a subset of the plurality of data elements based on a comparison between the ranking and a predetermined threshold. The predetermined threshold is based on a predetermined proportion of the plurality of data elements to be included in the subset. The system outputs a randomization scheme that includes the ranking and the predetermined proportion, wherein a second selection of a second subset of the plurality of data elements is based on the randomization scheme. The system output an indication of the subset and the second subset.

The systems and techniques described herein for data selection can provide a technical improvement by allowing computing systems to perform tasks they would otherwise not be able to do. For instance, the data selection systems and techniques described herein allow for randomized selection of a predetermined proportion of data elements in a data set, with the predetermined proportion enforced so that the selected subset of the dataset includes exactly the predetermined proportion of data elements from the data set. The data selection systems and techniques described herein allow the randomized selection to be scalable, for instance by generating a randomization scheme and allowing multiple computing systems to use the randomization scheme (e.g., in parallel, in series, or a combination thereof).

Various aspects of the application will be described with respect to the figures. FIG. 1 is a block diagram illustrating an example architecture of a selection system 100 for performing a randomized selection scalably across a distributed system, using a randomization scheme 125 to enforce a predetermined selection proportion. The selection system 100 includes special-purpose leader computer system(s) 110 that receives a request 105. The request 105 can identify, for instance, a dataset (e.g., from data store(s) 115), a proportion (e.g., a percentage) of the dataset to be randomly selected, and/or any other selection criteria.

The special-purpose leader computer system(s) 110 includes a randomization engine 120. The randomization engine 120 generates a randomization scheme 125. In some examples, the randomization scheme 125 includes a set of random numbers (e.g., a set of N random numbers, where N is a number of data elements in a batch), a ranking of the set of random numbers, a thresholding correspond to the predetermined selection proportion in the request 105, or a combination thereof. For instance, the random values 410 and the rankings 415 of the table diagram 400 of FIG. 4 can represent an example of the randomization scheme 125. The rankings of the random values 410 may rank the random values from highest to lowest, from lowest to highest, alphabetically (e.g., if the random values are characters rather than numbers), some other ranking organization, or a combination thereof.

The special-purpose leader computer system(s) 110 can send the randomization scheme 125 to various special-purpose follower computer systems, such as the special-purpose follower computer system(s) 130, the special-purpose follower computer system(s) 140, the special-purpose follower computer system(s) 150, and the special-purpose follower computer system(s) 160. Each of the special-purpose follower computer systems performs respective selections based on the randomization scheme 125 generated by the special-purpose leader computer system(s) 110. In particular, the special-purpose follower computer system(s) 130 performs selection(s) 135 based on the randomization scheme 125, the special-purpose follower computer system(s) 140 performs selection(s) 145 based on the randomization scheme 125, the special-purpose follower computer system(s) 150 performs selection(s) 155 based on the randomization scheme 125, and the special-purpose follower computer system(s) 160 performs selection(s) 165 based on the randomization scheme 125.

In some examples, the special-purpose leader computer system(s) 110 can direct different special-purpose follower computer systems to make random selections from different batches from a dataset in parallel. For instance, if a full dataset in the data store(s) 115 includes 400 data elements, the special-purpose leader computer system(s) 110 can have the special-purpose follower computer system(s) 130 perform the selection(s) 135 from a first batch of a first 100 data elements of the dataset based on the randomization scheme 125, the special-purpose follower computer system(s) 140 perform the selection(s) 145 from a second batch of a second 100 data elements of the dataset based on the randomization scheme 125, the special-purpose follower computer system(s) 150 perform the selection(s) 155 from a third batch of a third 100 data elements of the dataset based on the randomization scheme 125, and the special-purpose follower computer system(s) 160 perform the selection(s) 165 from a fourth batch of a fourth 100 data elements of the dataset based on the randomization scheme 125. The special-purpose follower computer systems (e.g., special-purpose follower computer system(s) 130, special-purpose follower computer system(s) 140, special-purpose follower computer system(s) 150, and special-purpose follower computer system(s) 160) then report their selections back up to the special-purpose leader computer system(s) 110. In some examples, the special-purpose leader computer system(s) 110 also makes its own selections from at least a portion (e.g., batch) of the dataset using the randomization scheme 125. The special-purpose leader computer system(s) 110 combines the selections together to form a combined randomized selection from the entire dataset, with the proportion identified in the request 105 enforced across this larger selection.

Another example of the parallel selection process is illustrated in FIG. 1. For instance, the data store(s) 115 may store a dataset ABCDFGHIJKLMNOPQRST that includes all of those letters (A, B, C, D, F, G, H, I, J, K, L, M, N, O, P, Q, R, S, and T) as data elements. The request 105 indicates that a user is requesting a randomized selection of 40% of the data elements, as indicated in the dash-lined callout reading "User: I need a random Selection(s) of 40% of accounts." The special-purpose leader computer system(s) 110 can generate the randomization scheme 125 and split the dataset into four batches (which can be referred to as batch sets) for each of the special-purpose follower computer systems to randomly select from according to the randomization scheme 125. Because the dataset includes 20 data elements, each of the four batch sets includes five data elements. In the illustrative example, then, the randomization scheme 125 may include five random values (each to correspond to one of the data elements), rankings for each of the five values (e.g., from highest to lowest), and a threshold (e.g., 2) that ensures that the special-purpose follower computer systems select two out of the five datasets in each batch (thereby selecting 40% of each batch to comply with the predetermined proportion in the request 105).

In an illustrative example, the special-purpose leader computer system(s) 110 splits the dataset ABCDFGHIJKLMNOPQRST into a first batch set ABCDE (that includes data elements A, B, C, D, and E), a second batch set FGHIJ (that includes data elements F, G, H, I, and J), a third batch set KLMNO (that includes data elements K, L, M, N, and O), and a fourth batch set PRQRST (that includes, P, Q, R, S, and T). In the illustrative example, the special-purpose leader computer system(s) 110 can have the special-purpose follower computer system(s) 130 perform the selection(s) 135 from a first batch set ABCDE of the dataset based on the randomization scheme 125 to select data elements A and C, the special-purpose follower computer system(s) 140 perform the selection(s) 145 from a second batch set FGHIJ of the dataset based on the randomization scheme 125 to select data elements F and J, the special-purpose follower computer system(s) 150 perform the selection(s) 155 from a third batch set KLMNO of the dataset based on the randomization scheme 125 to select data elements L and M, and the special-purpose follower computer system(s) 160 perform the selection(s) 165 from a fourth batch set of the dataset based on the randomization scheme 125 to select data elements R and T. The special-purpose follower computer systems then report their selections back up to the special-purpose leader computer system(s) 110. In some examples, the special-purpose leader computer system(s) 110 also makes its own selections from at least a portion (e.g., batch) of the dataset using the randomization scheme 125. The special-purpose leader computer system(s) 110 combines the selections together to form a combined randomized selection from the entire dataset, with the proportion identified in the request 105 enforced across this larger selection. In this illustrative example, the combined randomized selection from the entire dataset includes eight data elements A, C, F, J, L, M, R, and T. These eight data elements represent exactly 40% of the original dataset (which had 20 elements), thus enforcing the requested proportion (40%) while maintaining randomization in the selection process and allowing the selection process to be performed in a distributed fashion.

In some examples, the special-purpose leader computer system(s) 110 can split a dataset into batches that include adjacent or consecutive data elements, as in the illustrative example above. In some examples, the special-purpose leader computer system(s) 110 can also use random selection to split the dataset into batches, so that the batches themselves include randomly selected data elements. This may increase the degree of randomness in the final selection from the dataset, but may slightly increase computational resource usage.

In some examples, to increase randomization further, the special-purpose leader computer system(s) 110 generates different randomization schemes 125 for different special-purpose follower computer system(s). In some examples, these different randomization schemes 125 can be generated using different random values, but the same batch sizes and/or thresholds, thus enforcing the same requested proportion from the request 105 (e.g., 40%).

In some examples, the special-purpose leader computer system(s) 110 can generate different randomization schemes 125 over time, so that the same randomization scheme 125 does not stay in use for too long, making random selections start to become predictable. For instance, in some examples, the special-purpose leader computer system(s) 110 continues to receive more data from the data store(s) 115 over time (e.g., all as part of the dataset), and can batch portions of the dataset dynamically in real-time (or near real-time) as the dataset continues to be received (e.g., as in FIG. 5). The special-purpose leader computer system(s) 110 can continue to generate different randomization schemes 125 for the different batches dynamically in real-time (or near real-time) as the dataset continues to be received (e.g., as in FIG. 5).

In some examples, the data store(s) 115 includes one or more database(s), table(s), spreadsheet(s), list(s), array(s), arraylist(s), heap(s), trec(s), dictionar (ies), linked list(s), hash table(s), graph(s), stack(s), queue(s), tric(s), queap(s), distributed ledger(s), blockchain ledger(s), directed acyclic graph(s) (DAGs), data model(s), record(s), linked data structure(s), other data structure(s), or combination(s) thereof. In some examples, a dataset (e.g., in the data store(s) 115) can include data elements representing different devices, users, user accounts, or combinations thereof. In some examples, for instance, the data store(s) 115, and/or the dataset stored therein, can include data elements storing contents such as a name of a user, a mailing address of the user, a billing address of the user, an address of the user, a birth date of the user, an area (e.g., location coordinates, address, city, county, country, continent, region) of birth of the user, a home phone number of the user, an office phone number of the user, a cell phone number of the user, a phone number of the user, a location (e.g., location coordinates, address, city, county, country, continent, region, area) of the user (and/or of a user device of the user), a social security number (SSN) of the user, an individual taxpayer identification number (ITIN) of the user, a taxpayer identification number (TIN) of the user, a government-issued identification number of the user, an employer of the user, a race of the user, an ethnicity of the user, a gender of the user, a sex of the user, a height of the user, a weight of the user, an immigration status of the user, one or more political view(s) of the user, other demographic information associated with the user, other information associated with the user, a device identifier of a user's device (e.g., of a user's cell phone or other computing device), an account identifier of a user's account (e.g., on a website, with a service provider, in a bank or other financial institution, with a merchant, and the like), or a combination thereof. It should be understood that the types of information stored in the data store(s) 115, and in the dataset stored therein, can be limited to comply with laws, privacy practices, user preferences, or combinations thereof. Any of the types of information identified above can be omitted based on laws, privacy practices, user preferences, or combinations thereof.

In some examples, the special-purpose leader computer system(s) 110 can receive the request 105 from a user device associated with a user, for instance via a user interface (UI) (e.g., a graphical user interface (GUI)) of the user device. In some examples, at least some of the dataset in the data store(s) 115 can be received from a user device associated with a user, for instance via a user interface (UI) (e.g., a graphical user interface (GUI)) of the user device. In some examples, at least some of the dataset in the data store(s) 115 can be received from one or more external data sources, such as one or more database(s), server(s), data structure(s), or combinations thereof. The external data source(s) can be associated with one or more government(s), financial institution(s), credit bureau(s), bank(s), credit card companie(s), merchant(s), payment service(s), or combinations thereof.

Figure 2:
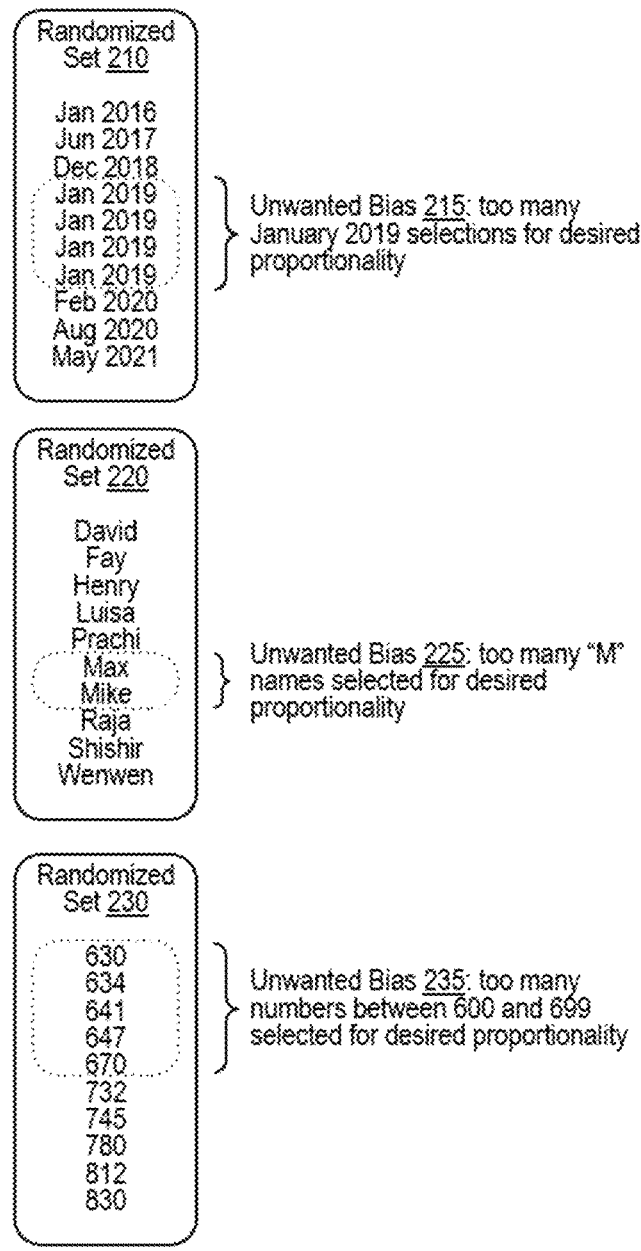
FIG. 2 is a conceptual diagram illustrating examples of randomized sets that include unwanted biases, in accordance with some examples.

FIG. 2 is a conceptual diagram 200 illustrating examples of randomized sets that include unwanted biases. For instance, the randomized set 210 includes a randomized selection month-and-year combinations. The randomized set 210 includes unwanted bias 215, for instance by including four January 2019 selections, which may be too many January 2019 for a desired proportionality. The randomized set 220 includes a randomized selection of names. The randomized set 220 includes unwanted bias 225, for instance by including two names that start with "M," which may be too many names that starting with "M" for a desired proportionality. The randomized set 230 includes a randomized selection of numbers between 600 and 900. The randomized set 230 includes unwanted bias 235, for instance by including five numbers between 600 and 699, which may be too many numbers between 600 and 699 for a desired proportionality.

One further benefit of performing the randomized selection in batches (e.g., selection(s) 135, selection(s) 145, selection(s) 155, selection(s) 165) according to a randomization scheme (e.g., randomization scheme 125) is to reduce unwanted biases such as the unwanted bias 215, the unwanted bias 225, or the unwanted bias 235. For instance, by enforcing the selection proportion (e.g., 40%) identified in the request 105 even among the selections from the batch sets (e.g., selection(s) 135, selection(s) 145, selection(s) 155, selection(s) 165) via the randomization scheme 125, the randomized selection from the dataset as a whole is more evenly distributed across the dataset, generally not including large clumps of identical or similar results. This can be desirable, for instance to aid in ensuring the selection does not disproportionately overrepresent or underrepresent a particular group (e.g., if the data elements represents users, user accounts, or user devices). This can help enforce fairness and equity in the selection process.

FIG. 3 is a table diagram 300 illustrating a randomized selection based on comparison of random values to a threshold. As noted above, RNG can be used to randomly select a subset of a data set. For instance, RNG (e.g., the randomization engine 120) can be used to generate a respective random value corresponding to each data element in a data set. The table diagram 300 includes data elements 305 numbered 1 through 10. For each of the data elements 305, a randomization system (e.g., the randomization engine 120) generates random values 310 between zero and 100. Desired proportions 330 for the random selection are that 80% should be in Group A, while 20% should be in Group B. The randomization system (e.g., the randomization engine 120) sets a threshold of 80 based on the desired proportions 330. The randomization system (e.g., the randomization engine 120) compares the random values 310 to the threshold to determine the selections 315 of which data elements 305 are to be in Group A or Group B. Any of the random values 310 that fall under the threshold (80) have their corresponding data elements 305 categorized into Group A in the selections 315, while any of the random values 310 that exceed the threshold (80) have their corresponding data elements 305 categorized into Group B in the selections 315.

However, the selections 315 ultimately cause three of the random values 310 to exceed the threshold (80). Thus, the actual proportions 335 of the random selection illustrated in FIG. 3 differ from the desired proportions 330. Specifically, the actual proportions 335 have 70% of the data elements 305 categorized into Group A, while 30% of the data elements 305 are categorized into Group B. This deviation between the desired proportions 330 and the actual proportions 335 can be referred to as a drift 340 of 10% (e.g., 80%−70%=10%; also, 30%−20%=10%). Thus, the desired proportions 330 are not enforced in the random selection of FIG. 3. In some examples, performing multiple random selection using the method shown in FIG. 3 can increase drift over time, moving increasingly away from the desired proportions 330. For instance, if the first batch of random selections has a drift 340 of 10% in a specific direction as illustrated (e.g., increasing the proportion in Group B and decreasing the proportion in Group A), and a second batch of random selections also has a drift of 10% in the same specific direction (e.g., increasing the proportion in Group B and decreasing the proportion in Group A), this can strengthen the change in proportion, making it harder to get back toward the desired proportions 330, exacerbating the drift 340.

Figure 4:
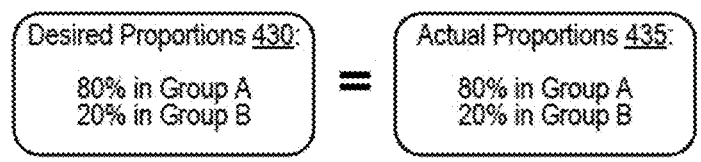
FIG. 4 is a table diagram illustrating a randomized selection based on a randomization scheme with random values, rankings of the random values, and comparison of the rankings to a threshold, in accordance with some examples.

FIG. 4 is a table diagram 400 illustrating a randomized selection based on a randomization scheme with random values 410, rankings 415 of the random values, and comparison of the rankings to a threshold. As in FIG. 3, RNG (e.g., the randomization engine 120) can be used to generate a respective random value corresponding to each data element in a data set. The table diagram 400 includes data elements 405 numbered 1 through 10. For each of the data elements 405, a randomization system (e.g., the randomization engine 120) generates random values 410 between zero and 100. The randomization system (e.g., the randomization engine 120) generates rankings 415 of the random values 410, in this case ranking the random values 410 from lowest (getting a ranking of 1) to highest (getting a ranking of 10). As in FIG. 3, the desired proportions 430 for the random selection are that 80% should be in Group A, while 20% should be in Group B. The randomization system (e.g., the randomization engine 120) sets a threshold of 8 based on the desired proportions 430. The randomization system (e.g., the randomization engine 120) compares the rankings 415 to the threshold to determine the selections 420 of which data elements 405 are to be in Group A or Group B. Any of the rankings 415 that are less than or equal to the threshold (8) have their corresponding data elements 405 categorized into Group A in the selections 420, while any of the rankings 415 that exceed the threshold (8) have their corresponding data elements 405 categorized into Group B in the selections 420.

In the randomized selections 420 of FIG. 4, the actual proportions 435 match the desired proportions 430. Like the desired proportions 430, the actual proportions 435 have 80% of the data elements 405 categorized into Group A, while 20% of the data elements 405 are categorized into Group B. Notably, if the randomized selection method illustrated in FIG. 3 were used with the random values 410, the actual proportions of the selection using the method of FIG. 3 (70% in Group A, 30% in Group B) would differ from the desired proportions 430, since the random values 410 include three values exceeding 80. By generating the rankings 415 and comparing the rankings 415 (not the random values 410 themselves) to the threshold, the selections 420 of FIG. 4 are able to enforce the desired proportions 430, to make the actual proportions 435 match the desired proportions 430, while still ensuring that the selections 420 are truly random.

In some examples, two or more of the random values 410 may match (e.g., may be identical). Such scenarios can be resolved in a number of ways. In a first example, the random values 410 can remain as generated (including the matching values), and the rankings 415 can indicate that these are "tied" by having the same ranking. However, such tied rankings can cause drift (e.g., drift 340) between desired proportions (e.g., desired proportions 430) and actual proportions (e.g., actual proportions 435), which is not desirable. In some examples, the randomization system (e.g., the randomization engine 120) re-generates the random values for all of the values that match, until values are generated that do not match. In some examples, randomization system (e.g., the randomization engine 120) re-generates the random values for all but one of the values that match, until values are generated that do not match, for instance selecting which one(s) are re-generated, or selecting which one is not re-generated, using a random selection, an order that the data elements 405 are arranged in, or a combination thereof. In some examples, the random values 410 remain unchanged, but the randomization system (e.g., the randomization engine 120) instead randomly selects a ranking for the matching values, for instance based on further random values associated with each of the matching values, an order that the data elements 405 are arranged in, or a combination thereof.

Figure 5:
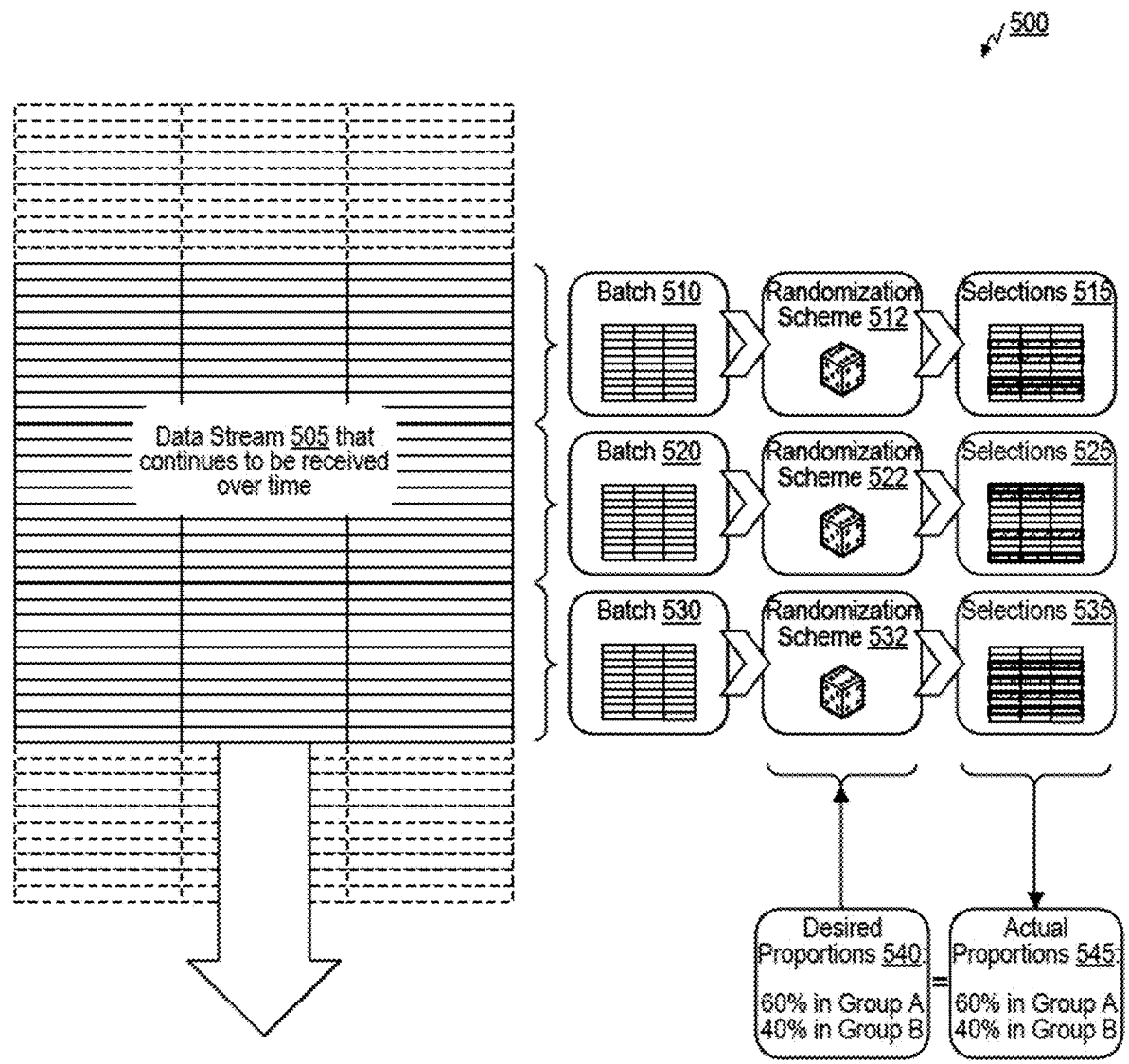
FIG. 5 is a conceptual diagram illustrating a process for dynamically making randomized selections from a data stream in a continuous fashion (e.g., in real-time or near real-time) as further data continues to be received via the data stream over time, in accordance with some examples.

FIG. 5 is a conceptual diagram 500 illustrating a process for dynamically making randomized selections from a data stream in a continuous fashion (e.g., in real-time or near real-time) as further data continues to be received via the data stream over time. A data stream 505 is illustrated, which can represent, for instance, a stream of data that serves as an evolving dataset (that continues to increase in size over time) from which a selection system (e.g., the selection system 100) randomly selects a subset according to a randomization scheme (e.g., randomization scheme 125). The data stream 505 can be stored in the data store(s) 115 on an ongoing basis as the data stream 505 continues to be received.

The data stream 505 includes large quantities of data that continue to come on over a long period of time. In some examples, for instance, the data stream 505 can include data about user accounts, transactions, user interface interactions, user devices, or a combination thereof. For instance, a service that serves tens of millions of users may receive tens of millions, or even hundreds of millions, of data elements daily regarding user accounts, transactions, user interface interactions, user devices, and the like. Being able to handle randomized selections across these types of volumes of data dynamically on an ongoing basis (e.g., in real-time or near real-time) while maintaining a desired proportion, and doing so in a scalable way (e.g., in a way that allows for parallelization across a distributed network of computers) (e.g., as discussed with respect to the selection system 100 and the table diagram 400) solves a significant technical problem.

In some examples, a system (e.g., the special-purpose leader computer system(s) 110) can extract batches of data (e.g., batch 510, batch 520, batch 530) from the data stream 505 dynamically and in real-time (or near-real-time) as the data from the data stream 505 continues to be received by the system. In some examples, the system (e.g., the special-purpose leader computer system(s) 110) can generate randomization scheme(s) (e.g., randomization scheme 512, randomization scheme 522, randomization scheme 532) that the system (e.g., the special-purpose follower computer systems of the selection system 100 and/or the special-purpose leader computer system(s) 110 itself) can use to make randomized selections (e.g., selections 515, selections 525, selections 535) from the batches (e.g., batch 510, batch 520, batch 530). The system (e.g., the special-purpose leader computer system(s) 110) can generate the randomization scheme(s) based on a set of desired proportions 540 that can be identified in a request, for instance as in the special-purpose leader computer system(s) 110 generating the randomization scheme(s) 125 based on a set of desired proportions identified in the request 105. In some examples, the randomization scheme(s) (e.g., randomization scheme 512, randomization scheme 522, randomization scheme 532) include a quantity of random values (e.g., random values 410) that matches the quantity of data elements in the batches (e.g., number of data elements 405, and/or number of data elements in batch 510, batch 520, batch 530), respective rankings for each of the random values (e.g., rankings 415), a threshold chosen based on the desired proportions 540 and the quantity of data elements in the batches, or a combination thereof. The quantity of data elements in the batches can be referred to as the batch size of the batches. In an illustrative example, the desired proportions 540 may be that 60% of the dataset (e.g., of the data stream 505) should be selected for Group A, while 40% of the dataset (e.g., of the data stream 505) should be selected for Group B. If the batch size is 100 data elements per batch, then the threshold can be set at 60, with data elements whose corresponding randomized values have a ranking less than or equal to the threshold (60) being selected to be in Group A, and data elements whose corresponding randomized values have a ranking greater than the threshold (60) being selected to be in Group B. Alternately, the threshold can be set at 40, with data elements whose corresponding randomized values have a ranking greater than the threshold (40) being selected to be in Group A, and data elements whose corresponding randomized values have a ranking less than or equal to the threshold (40) being selected to be in Group B. In this way, the actual proportions 545 that result from the selections (e.g., selections 515, selections 525, selections 535) match the desired proportions 540.

In some examples, two or more of the randomization scheme(s) (e.g., randomization scheme 512, randomization scheme 522, randomization scheme 532) can match (e.g., be the same as) one another. In some examples, two or more of the randomization scheme(s) (e.g., randomization scheme 512, randomization scheme 522, randomization scheme 532) can differ from (e.g., be distinct from) one another. For instance, in some examples, the randomization scheme(s) (e.g., randomization scheme 512, randomization scheme 522, randomization scheme 532) can have different random values (e.g., random values 410), different rankings (e.g., rankings 415), different thresholds, different batch sizes, or a combination thereof.

In some examples, a drift (e.g., drift 340) may develop between the desired proportions (e.g., desired proportions 430, desired proportions 540) and the actual proportions (e.g., actual proportions 435, actual proportions 545) even using the randomized selection method illustrated in FIG. 4, for instance because the number of data elements 405 in the batch (e.g., 10 in the table diagram 400 of FIG. 4) cannot be cleanly divided into the desired proportions 430. For instance, if the desired proportion 430 is instead 78% in Group A, and 22% in Group B, a drift will manifest between the desired proportions (e.g., desired proportions 430) and the actual proportions (e.g., actual proportions 435) because there is no way to cleanly select 78% (or 22%) of 10 items. In some examples, a random selection system (e.g., the selection system 100) can solve this issue by generating and providing different randomization schemes 125 with different thresholds for different batches. For instance, because $78/100$ reduces to $39/50$, and 7+ (8*4)=39, the random selection system (e.g., the selection system 100) can generate four randomization schemes 125 in which the threshold is 8, and one randomization scheme 125 in which the threshold is 7, thus correcting for the drift once randomized selection is performed over all 5 batches and combined. Thus, in some examples, the randomization scheme(s) (e.g., randomization scheme 512, randomization scheme 522, randomization scheme 532) can have different thresholds.

In some examples, the desired proportions (e.g., desired proportions 430, desired proportions 540) may be impossible to achieve based on the batch size, the total number of data elements, the values chosen for the desired proportions themselves, or a combination thereof. In such examples, the random selection system (e.g., the selection system 100) can provide different randomization schemes 125 with different thresholds for different batches as discussed above, to get the actual proportions (e.g., actual proportions 435, actual proportions 545) to continuously approach the desired proportions (e.g., desired proportions 430, desired proportion 540) as closely as possible. For instance, if the total number of data elements in the whole dataset is 100, and the desired proportions are 50.1% in Group A and 49.9% in group B, these percentages are not possible to achieve with 100 data elements (but would be possible to achieve with 1000 data elements). In this illustrative example, for a batch size of 10, the random selection system (e.g., the selection system 100) can generate randomization scheme(s) 125 in which the threshold is 5, to produce actual proportions of 50% in Group A and 50% in group B. In some examples, a user can even select an irrational number (e.g., a multiple of pi) as a desired proportion, and the randomization system can continuously select thresholds for different randomization schemes 125 for randomly selecting from different batches to account for and correct drift to continue approaching the desired proportion to the closest extent possible given the batch sizes and quantities. For instance, if the desired proportions indicate that pi percent (~3.14159 . . . %) of a dataset should be selected for group A, the batch size is 1000 data elements, and the actual proportion selected for group A so far (e.g., of the data stream 505 as the data stream 505 continues to be received) is 3.16%, then the random selection system (e.g., the selection system 100) can generate the next randomization scheme 125 (e.g., randomization scheme 512, randomization scheme 522, or randomization scheme 532) with a threshold of 31 (rather than 32) to bring the actual proportion selected for group A toward 3.1% rather than 3.2%, thereby bring the actual proportion selected for group A toward the desired proportions of pi percent (~3.14159 . . . %) selected for group A.

Figure 6:
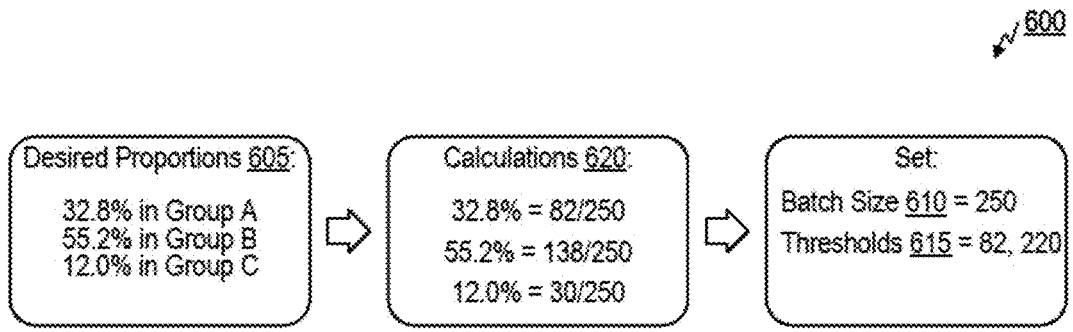
FIG. 6 is a conceptual diagram illustrating determination of a batch size and thresholds for random selections based on desired proportions to be enforced, in accordance with some examples.

FIG. 6 is a conceptual diagram 600 illustrating determination of a batch size 610 and thresholds 615 for random selections based on desired proportions 605 to be enforced. In some examples, the random selection system (e.g., the selection system 100) can select the batch size 610 and the thresholds 615 of the randomization scheme(s) 125 to make the actual proportions (e.g., actual proportions 435, actual proportions 545) match or approach the desired proportions 605 (e.g., desired proportion 430, desired proportions 540).

While some of the examples discussed herein select each data element to be in one of two groups (e.g., Group A or Group B), in some examples, the systems and methods discussed herein can be used to select each data element to be in one of three or more groups (e.g., any of Group A, Group B, Group C, Group D, etc.). For instance, if the rank corresponding to particular data element falls within a first range (e.g. from 1 to 25), the data element is categorized into Group A; if the rank corresponding to particular data element falls within a second range (e.g. from 26 to 50), the data element is categorized into Group B; if the rank corresponding to particular data element falls within a third range (e.g. from 51 to 75), the data element is categorized into Group C; and if the rank corresponding to particular data element falls within a fourth range (e.g. from 76 to 100), the data element is categorized into Group D.

In an illustrative example, the desired proportions 605 selected by a user (e.g., via the request 105) indicates that 32.8% of a dataset (e.g., the data stream 505, data set in the data store(s) 115) is to be randomly selected to be in Group A, 55.2% of the dataset is to be randomly selected to be in Group B, and 12.0% of the dataset is to be randomly selected to be in Group C. In some examples, the random selection system (e.g., the selection system 100) can perform calculations 620 to identify fractions (e.g., reduced fractions having a common denominator) that are equivalent to the desired proportions 605. For instance, 32.8% (the desired proportion for Group A) is equivalent to $^{82}/_{250}$, 55.2% (the desired proportion for Group B) is equivalent to $^{138}/_{250}$, and 12.0% (the desired proportion for Group C) is equivalent to $^{30}/_{250}$. Based on these fractions in the calculations 620, the random selection system (e.g., the selection system 100) can select the batch size 610 to be 250 (equivalent to the denominator of the fractions in the calculations 620) and the thresholds 615 to be 82 and 220. The first of the thresholds 615 (82) is the numerator of the fraction for 32.8% (the desired proportion for Group A) in the calculations 620. The second of the thresholds 615 (220) is the sum of the numerator of the fraction for 32.8% (the desired proportion for Group A) in the calculations 620 (82) and the is the numerator of the fraction for 55.2% (the desired proportion for Group B) in the calculations 620 (138). That is, 82+138=220.

Thus, if the rank corresponding to particular data element falls within a first range (e.g. from 1 to 82), the data element is categorized into Group A; if the rank corresponding to particular data element falls within a second range (e.g. from 83 to 220), the data element is categorized into Group B; and if the rank corresponding to particular data element falls within a third range (e.g. from 221 to 250), the data element is categorized into Group C.

In some examples, the batch size 610 can also be selected based on the size of the overall dataset. For instance, the batch size 610 can be selected to be a value that the size of the overall dataset is divisible by the batch size 610. For instance, if the size of the overall dataset is 100,000 data elements, then a batch size 610 of 250 works, because 100,000/250=400. In some examples, (e.g., where the dataset is a data stream 505 that continues to receive data over time, or where the size of the overall dataset is a prime number), the batch size may vary as needed. For instance, if the size of the overall dataset is 3037, the random selection system (e.g., the selection system 100) can determine that 3037 is a prime number and won't be divisible by any batch size. Thus, the batch size 610 of a majority of the batches can be selected to be 250, and a single batch can have a batch size of 37.

Figure 7:
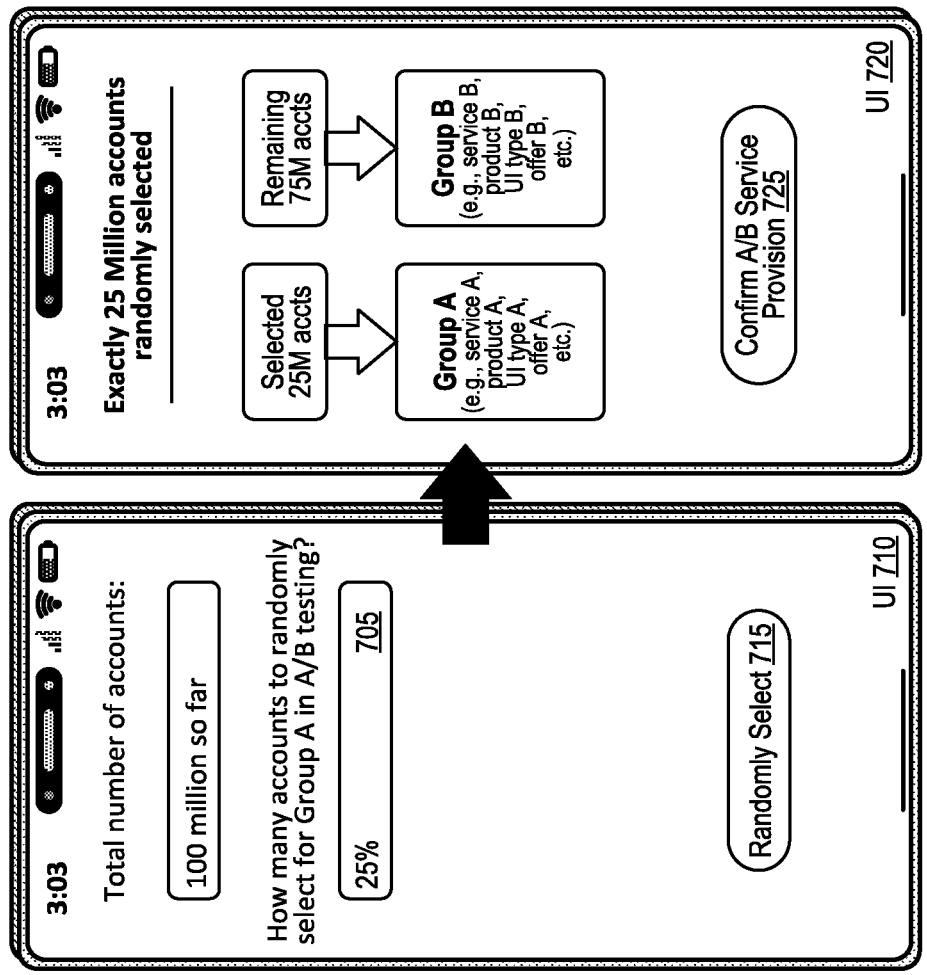
FIG. 7 is a conceptual diagram illustrating examples of user interfaces (UIs) for establishing A/B testing of various services or interfaces based on randomized selections, in accordance with some examples.

FIG. 7 is a conceptual diagram 700 illustrating examples of user interfaces (UIs) for establishing A/B testing of various services or interfaces based on randomized selections. The UI 710 identifies that the dataset (e.g., dataset in the data store(s) 115, data stream 505) includes 100 million accounts so far (e.g., 100 million data elements, where each data element identifies and/or is indicative of an account), with the dataset potentially continuing to grow over time (e.g., as in the data stream 505). The UI 710 includes a user interface element 705 (e.g., a field) through which a user can select (e.g., type in) a desired proportion (e.g., desired proportions 430, desired proportions 540, desired proportions 605) to be selected into Group A for A/B testing. In an illustrative example, the user interface element 705 identifies that 25% of the dataset should be selected to be in Group A. The UI 710 includes a user interface element 715 (e.g., a button) that can be interacted with to confirm that the random selection system (e.g., the selection system 100) should proceed with generating the randomization scheme(s) 125, and with performing the random selection(s) (e.g., selection(s) 135, selection(s) 145, selection(s) 155, selection(s) 165, selections 420, selections 515, selections 525, selections 535) according to the randomization scheme(s) 125.

The UI 720 notes that the randomized selection has been completed, and that exactly 25 million accounts have been randomly selected into Group A, with the remaining 75 million accounts selected into Group B. In some examples, Group A and Group B can be provided with different services (e.g., service A vs. service B), different products (e.g., product A vs. product B), different UI types or styles (e.g., UI type A vs. UI type B), different offers (e.g., offer A vs. offer B), or a combination thereof. The UI 710 includes a user interface element 725 (e.g., a button) that can be interacted with to confirm the selection of the 25 million accounts into Group A (e.g., to be provided with service A, product A, UI type A, and/or offer A) and the selection of the remaining 75 million accounts into Group B (e.g., to be provided with service B, product B, UI type B, and/or offer B). In some examples, Group A may be a text group, while Group B may be a control group, or vice versa.

Figure 8:
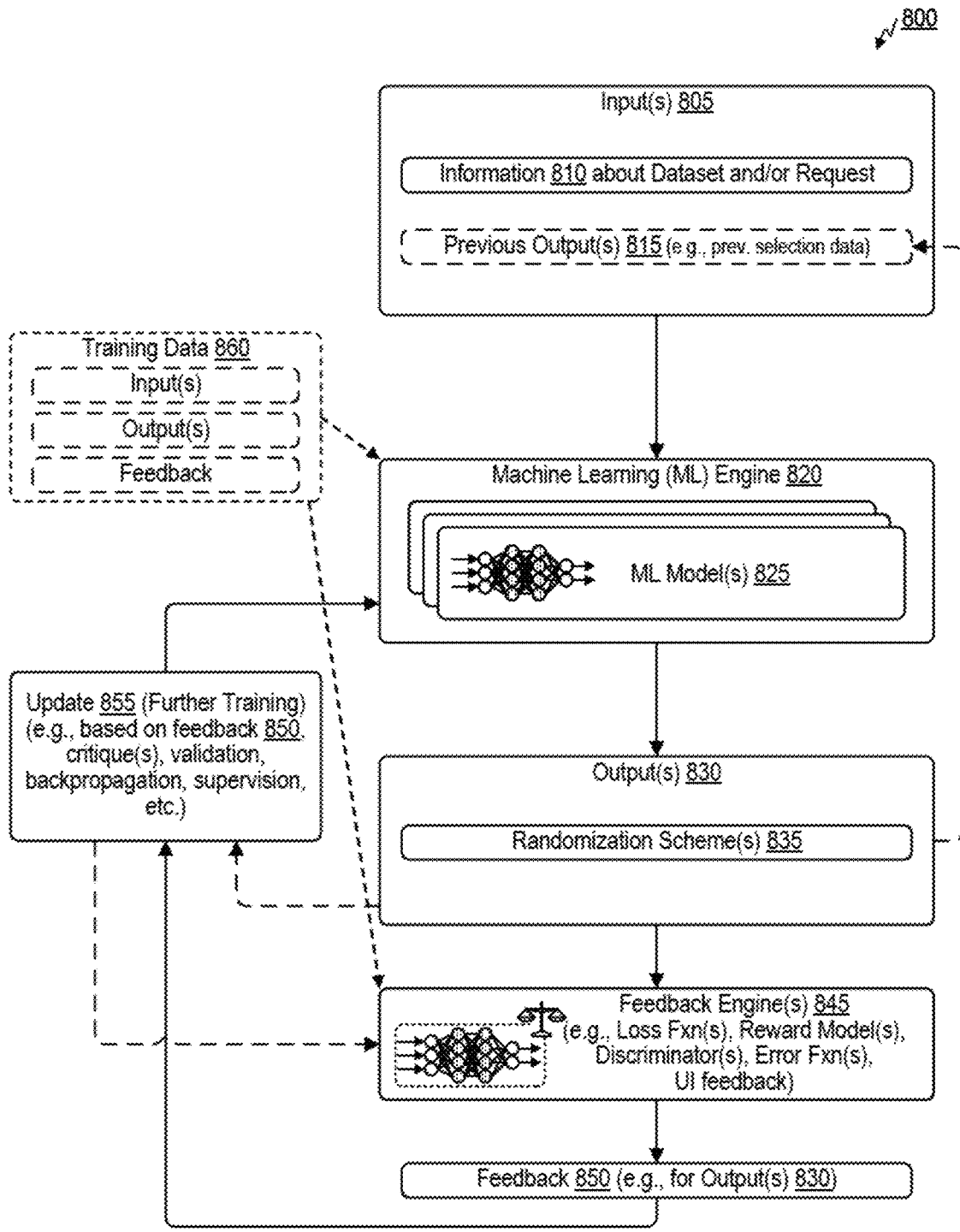
FIG. 8 is a block diagram illustrating an example of a machine learning system for training and use of one or more machine learning model(s) used to generate selection data based on data elements, in accordance with some examples.

FIG. 8 is a block diagram illustrating an example of a machine learning system 800 for training and use of one or more machine learning model(s) 825 used to generate selection data based on data elements. The machine learning system 800 a machine learning (ML) engine 820 that generates, trains, uses, and/or updates one or more ML model(s) 825. The ML model(s) 825 can include, for instance, one or more neural network (NN(s)), convolutional NN(s) (CNN(s)), trained time delay NN(s) (TDNN(s)), deep network(s), autoencoder(s) (AE(s)), variational AE(s) (VAE(s)), deep belief net(s) (DBN(s)), recurrent NN(s) (RNN(s)), generative adversarial network(s) (GAN(s)), conditional GAN(s) (cGAN(s)), support vector machine(s) (SVM(s)), random forest(s) (RF(s)), decision tree(s), NN(s) with fully connected (FC) layer(s), NN(s) with convolutional layer(s), computer vision system(s), deep learning system(s), classifier(s), transformer(s), clustering algorithm(s), reinforcement learning model(s), supervised learning model(s), unsupervised learning model(s), gradient boosting model(s), sequence-to-sequence (Seq2Seq) model(s), autoregressive (AR) model(s), large language model(s) (LLMs), or combinations thereof. Examples of LLMs that can be used can include, for instance, a Generative Pre-Trained Transformer (GPT) (e.g., GPT-2, GPT-3, GPT-3.5, GPT-4, and/or other GPT variant(s)). DaVinci, an LLM using Massachusetts Institute of Technology (MIT) langchain, Google® Bard®, Google® Gemini®, Large Language Model Meta AI (LLaMA), another LLM, or a combination thereof.

Within FIG. 8, a graphic representing the ML model(s) 825 illustrates a set of circles connected to one another. Each of the circles can represent a node, a neuron, a perceptron, a layer, a portion thereof, or a combination thereof. The circles are arranged in columns. The leftmost column of white circles represent an input layer. The rightmost column of white circles represent an output layer. Two columns of shaded circled between the leftmost column of white circles and the rightmost column of white circles each represent hidden layers. An ML model can include more or fewer hidden layers than the two illustrated, but includes at least one hidden layer. In some examples, the layers and/or nodes represent interconnected filters, and information associated with the filters is shared among the different layers with each layer retaining information as the information is processed. The lines between nodes can represent node-to-node interconnections along which information is shared. The lines between nodes can also represent weights (e.g., numeric weights) between nodes, which can be tuned, updated, added, and/or removed as the ML model(s) 825 are trained and/or updated. In some cases, certain nodes (e.g., nodes of a hidden layer) can transform the information of each input node by applying activation functions (e.g., filters) to this information, for instance applying convolutional functions, downscaling, upscaling, data transformation, and/or any other suitable functions.

In some examples, the ML model(s) 825 can include a feed-forward network, in which case there are no feedback connections where outputs of the network are fed back into itself. In some cases, the ML model(s) 825 can include a recurrent neural network, which can have loops that allow information to be carried across nodes while reading in input. In some cases, the network can include a convolutional neural network, which may not link every node in one layer to every other node in the next layer.

One or more input(s) 805 can be provided to the ML model(s) 825. The ML model(s) 825 can be trained by the ML engine 820 (e.g., based on training data 860) to generate one or more output(s) 830. In some examples, the input(s) 805 include information 810 about the dataset (e.g., information about the dataset stored in the data store(s) 115, information about the data store(s) 115 itself, information about the data stream 505 that adds to and/or makes up the dataset over time) and/or the request (e.g., request 105) for randomly selecting from the dataset. In some examples, the information 810 can include a size of the dataset (e.g., in terms of number of data elements), a type or format of the dataset and/or data store(s) 115 (e.g., database, spreadsheet, table, tree, ledger, heap, or other type of format discussed herein), a batch size (if a batch size has already been selected), desired proportion(s) identified in the request (e.g., desired proportions 330, desired proportions 430, desired proportions 540, desired proportions 605), actual proportions of any selections already made (e.g., if selections are continuing to be made over time in a batch-by-batch process as in FIG. 1 or FIG. 5), types of data elements (e.g., representing users, accounts, user devices, transactions, products, services, merchants, customers, sellers, buyers, offers, lenders, borrowers, and/or other entities) or a combination thereof.

In some examples, the input(s) 805 can include previous output(s) 815, such as randomization scheme(s) 835 previously-generated buy the ML model(s) 825, and/or other types of output(s) 830 previously generated by the ML model(s) 825. In some examples, the input(s) 805 can include partially-processed data that is to be processed further, such as various features, weights, intermediate data, layer data from specific layer(s) of the ML model(s) 825, or a combinations thereof.

The output(s) 830 generated by the ML model(s) 825 in response to input of the input(s) 805 (e.g., in response to the information 810 and/or previous output(s) 815) into the ML model(s) 825 can include one or more randomization scheme(s) 835. Examples of the randomization scheme(s) 835 include the randomization scheme(s) 125, a randomization scheme that includes elements of the table diagram 400 (e.g., the amount of the data elements 405 in the batch, the random values 410, the rankings 415, and/or a threshold (8) to compare the rankings 415 to in order to make the selections 420), the randomization scheme 512, the randomization scheme 522, the randomization scheme 532, a randomization scheme with the batch size 610 and/or the thresholds 615, a randomization scheme generated based on the UI 710 and used to make the randomized selection shown in the UI 720, the randomization scheme of the process 900, or a combination thereof. In some examples, the randomization scheme(s) 835 can each include a batch size (e.g., quantity of data elements per batch, as in the quantity of data elements 405 or the batch size 610), a random values in a quantity matching the batch size (e.g., the random values 410 in a quantity matching the quantity of the data elements 405), rankings for each of the random values (e.g., the rankings 415 for each of the random values 410), a threshold to compare the rankings to (e.g., the threshold of 8 that the rankings 415 are compared to in order to make the selections 420, the thresholds 615), or a combination thereof. In some examples, the randomization scheme(s) 835 include a single randomization scheme 835 that is to be used for multiple randomized selections from multiple datasets and/or batches (e.g., selection(s) 135, selection(s) 145, selection(s) 155, selection(s) 165, selections 420, selections 515, selections 525, selections 535, the selection of the first subset in operation 920, the second selection of the second subset in operation 925). In some examples, the randomization scheme(s) 835 include multiple randomization schemes 835 that are each to be used for one or more randomized selections from one or more batches of a single dataset (e.g., selection(s) 135, selection(s) 145, selection(s) 155, selection(s) 165, selections 420, selections 515, selections 525, selections 535, the selection of the first subset in operation 920, the second selection of the second subset in operation 925).

In some examples, the ML system that includes the ML engine 820 and/or ML model(s) 825 adds the randomization scheme(s) 835 to the data store(s) 115. Data can be drawn from these data store(s) 115 to use as input(s) 805 for the ML model(s) 825 for generating future randomization scheme(s) 835 and/or other output(s) 830.

In some examples, the ML system repeats the process illustrated in FIG. 8 multiple times to generate the output(s) 830 in multiple passes, using some of the output(s) 830 from earlier passes as some of the input(s) 805 in later passes. For instance, in an illustrative example, in a first pass, the ML model(s) 825 can generate the randomization scheme(s) 835 based on input of the information 810 about the dataset and/or the request into the ML model(s) 825. In a second pass, the ML model(s) 825 can add (e.g., append) the randomization scheme(s) 835 to the input(s) 805 (e.g., as the previous output(s) 815), and can generate further randomization scheme(s) 835 based on input of the input(s) 805 (e.g., updated to include the information 810 about the dataset and/or the request and/or the previous output(s) 815 from the first pass) into the ML model(s) 825.

In some examples, the ML system includes one or more feedback engine(s) 845 that generate and/or provide feedback 850 about the output(s) 830. In some examples, the feedback 850 indicates how well the output(s) 830 align to corresponding expected output(s), how well the output(s) 830 serve their intended purpose, or a combination thereof. In some examples, the feedback engine(s) 845 include loss function(s), reward model(s) (e.g., other ML model(s) that are used to score the output(s) 830), discriminator(s), error function(s) (e.g., in back-propagation), user interface feedback received via a user interface from a user, or a combination thereof. In some examples, the feedback 850 can include one or more alignment score(s) that score a level of alignment between the output(s) 830 and the expected output(s) and/or intended purpose.

The ML engine 820 of the ML system can update (further train) the ML model(s) 825 based on the feedback 850 to perform an update 855 (e.g., further training) of the ML model(s) 825 based on the feedback 850. In some examples, the feedback 850 includes positive feedback, for instance indicating that the output(s) 830 closely align with expected output(s) and/or that the output(s) 830 serve their intended purpose. In some examples, the feedback 850 includes negative feedback, for instance indicating a mismatch between the output(s) 830 and the expected output(s), and/or that the output(s) 830 do not serve their intended purpose. For instance, high amounts of loss and/or error (e.g., exceeding a threshold) can be interpreted as negative feedback, while low amounts of loss and/or error (e.g., less than a threshold) can be interpreted as positive feedback. Similarly, high amounts of alignment (e.g., exceeding a threshold) can be interpreted as positive feedback, while low amounts of alignment (e.g., less than a threshold) can be interpreted as negative feedback. In response to positive feedback in the feedback 850, the ML engine 820 can perform the update 855 to update the ML model(s) 825 to strengthen and/or reinforce weights associated with generation of the output(s) 830 to encourage the ML engine 820 to generate similar output(s) 830 given similar input(s) 805. In response to negative feedback in the feedback 850, the ML engine 820 can perform the update 855 to update the ML model(s) 825 to weaken and/or remove weights associated with generation of the output(s) 830 to discourage the ML engine 820 from generating similar output(s) 830 given similar input(s) 805.

In an illustrative example, if the ML model(s) 825 generate randomization scheme(s) 835, and selections (e.g., selection(s) 135, selection(s) 145, selection(s) 155, selection(s) 165, selections 420, selections 515, selections 525, selections 535, the selection of the first subset in operation 920, the second selection of the second subset in operation 925) that are made according to the randomization scheme(s) 835 end up selecting subset(s) of the dataset at an actual proportion (e.g., actual proportion 335, actual proportion 435, actual proportion 545) that matches a desired proportion (e.g., desired proportion in the request 105, desired proportions 330, desired proportions 430, desired proportions 540, desired proportions 605, desired proportion in the user interface element 705), or that is within a threshold range of the desired proportion (e.g., within 1%, within 5%, within 10%), this can be interpreted as positive feedback (e.g., of the feedback 850), strengthening the weights of the ML model(s) 825 that were responsible for generating the randomization scheme(s) 835 to encourage generation of similar output(s) 830 given similar input(s) 805. On the other hand, if the ML model(s) 825 generate the randomization scheme(s) 835, and the selections that are made according to the randomization scheme(s) 835 end up selecting subset(s) of the dataset at an actual proportion that does not match the desired proportion, and/or that is outside of the threshold range of the desired proportion, this can be interpreted as negative feedback (e.g., of the feedback 850), weakening the weights of the ML model(s) 825 that were responsible for generating the randomization scheme(s) 835 to discourage generation of similar output(s) 830 given similar input(s) 805.

In some examples, the ML engine 820 can also perform an initial training of the ML model(s) 825 before the ML model(s) 825 are used to generate the output(s) 830 based on the input(s) 805. During the initial training, the ML engine 820 can train the ML model(s) 825 based on training data 860. In some examples, the training data 860 includes examples of input(s) (of any input types discussed with respect to the input(s) 805), output(s) (of any output types discussed with respect to the output(s) 830), and/or feedback (of any feedback types discussed with respect to the feedback 850). In an illustrative example, the training data 860 can include information about the dataset and/or the request (as in the information 810 about the dataset and/or the request), previous output(s) (as in the previous output(s) 815), randomization scheme(s) that correspond to the information about the dataset and/or the request (as in the randomization scheme(s) 835), and feedback indicating whether the randomization scheme(s) are appropriate given the information about the dataset and/or the request and/or the previous output(s). In some cases, positive feedback in the training data 860 can be used to perform positive training, to encourage the ML model(s) 825 to generate output(s) similar to the output(s) in the training data given input of the corresponding input(s) in the training data. In some cases, negative feedback in the training data 860 can be used to perform negative training, to discourage the ML model(s) 825 from generate output(s) similar to the output(s) in the training data given input of the corresponding input(s) in the training data.

In some examples, the ML model(s) 825 can generate the output(s) 830 (e.g., the randomization scheme(s) 835) dynamically and in real-time as the input(s) 805 (e.g., the information 810 about the dataset and/or the request and/or the previous output(s) 815) continue to be received by the ML model(s) 825. This can ensure that the output(s) 830 (e.g., the randomization scheme(s) 835) are generated based on up-to-date input(s) 805. For instance, if the dataset is a data stream 505 that continues to be received over time, the information 810 about the dataset and/or the request may continue to be received and/or updated over time as well, to match.

Figure 9:
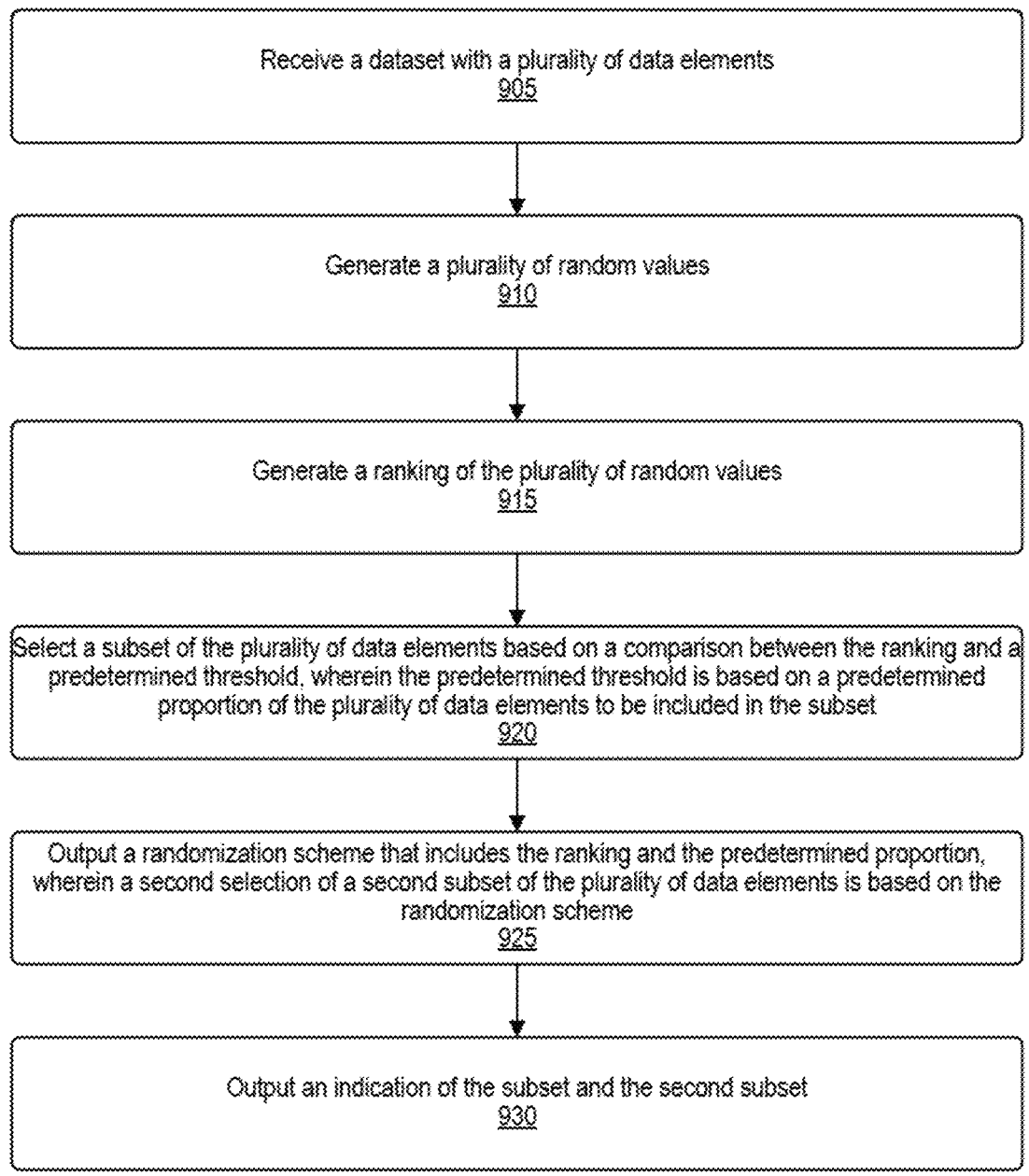
FIG. 9 is a flow diagram illustrating a process for scalable data selection according to an enforced randomization scheme, in accordance with some examples.

FIG. 9 is a flow diagram illustrating a process 900 for scalable data selection according to an enforced randomization scheme. The process 900 may be performed by a data selection system. In some examples, the enrollment orchestration system can include, for example, the selection system 100, the special-purpose leader computer system(s) 110, a device (e.g., user device) that sends the request 105 to the special-purpose leader computer system(s) 110, the data store(s) 115, the randomization engine 120, the special-purpose follower computer system(s) 130, the special-purpose follower computer system(s) 140, the special-purpose follower computer system(s) 150, the special-purpose follower computer system(s) 160, a system that generates a randomization scheme that includes the random values 410 and/or the rankings 415 and/or a threshold (8) according to the desired proportions 430, a system that generates the selections 420 in the actual proportions 435, system(s) (e.g., the data store(s) 115, external source(s)) from which the data stream 505 is received, system(s) (e.g., the special-purpose leader computer system(s) 110, the data store(s) 115) that receive the data stream 505, system(s) (e.g., special-purpose leader computer system(s) 110) that identify batches (e.g., batch 510, batch 520, batch 530) and/or generate corresponding randomization schemes (e.g., randomization scheme 512, randomization scheme 522, randomization scheme 532) based on desired proportions 540, system(s) (e.g., special-purpose follower computer systems) that make selection(s) (e.g., selections 515, selections 525, selections 535) according to corresponding randomization schemes (e.g., randomization scheme 512, randomization scheme 522, randomization scheme 532) at actual proportions 545, systems (e.g., special-purpose leader computer system(s) 110) that identify a batch size 610 and/or thresholds 615 based on desired proportions 605 and/or calculations 620 and/or dataset size, system(s) with user interfaces for setting up and/or performing randomized selections (e.g., UI 710, UI 720), the ML system 800, the ML engine 820, the ML model(s) 825, the feedback engine 845, the computing system 1000, the processor 1010, an apparatus, a system, a non-transitory computer-readable medium coupled to a processor, a subsystem or component of any of the previously-listed systems, or a combination thereof.

At operation 905, the data selection system (or a component or subsystem thereof) is configured to, and can, receive a dataset (e.g., dataset in the data store(s) 115, data elements 305, data elements 405, data stream 505) with a plurality of data elements.

At operation 910, the data selection system (or a component or subsystem thereof) is configured to, and can, generate a plurality of random values (e.g., random values 310, random values 410).

In some aspects, the plurality of random values are a plurality of random numbers (e.g., as in the random values 310 or the random values 410). In some aspects, the plurality of random values are a plurality of random characters (e.g., alphabetical characters, alphanumeric characters, etc.).

At operation 915, the data selection system (or a component or subsystem thereof) is configured to, and can, generate a ranking (e.g., rankings 415) of the plurality of random values.

At operation 920, the data selection system (or a component or subsystem thereof) is configured to, and can, select a subset of the plurality of data elements based on a comparison between the ranking and a predetermined threshold (e.g., threshold of 8 in FIG. 4, thresholds 615). The predetermined threshold is based on a predetermined proportion of the plurality of data elements to be included in the subset (e.g., desired proportion in the request 105, desired proportions 330, desired proportions 430, desired proportions 540, desired proportions 605, desired proportion in the user interface element 705).

In some aspects, selecting the subset of the plurality of data elements based on the comparison (of operation 920) includes identifying whether a rank of a random value exceeds the predetermined threshold. A data element corresponding to the random value is included in the selection based on whether the rank of the random value exceeds the predetermined threshold. The data element is one of the plurality of data elements. The random value is one of the plurality of random values. The rank of the random value is part of the ranking.

In some aspects, the comparison between the ranking and the predetermined threshold is a comparison between the ranking and a predetermined range. The predetermined range spans between the predetermined threshold and a second threshold. For instance, while some of the examples discussed herein select each data element to be in one of two groups (e.g., Group A or Group B), in some examples, the systems and methods discussed herein can be used to select each data element to be in one of three or more groups (e.g., any of Group A, Group B, Group C, Group D, etc.). For instance, if the rank corresponding to particular data element falls within a first range (e.g. from 1 to 25), the data element is categorized into Group A; if the rank corresponding to particular data element falls within a second range (e.g. from 26 to 50), the data element is categorized into Group B; if the rank corresponding to particular data element falls within a third range (e.g. from 51 to 75), the data element is categorized into Group C; and if the rank corresponding to particular data element falls within a fourth range (e.g. from 76 to 100), the data element is categorized into Group D. Examples of multiple thresholds being used to form such ranges to select between three or more groups includes the thresholds 615 of FIG. 6. In some aspects, selecting the subset of the plurality of data elements based on the comparison (as in operation 920) includes identifying whether a rank of a random value falls within the predetermined range. A data element corresponding to the random value is included in the selection based on whether the rank of the random value falls within the predetermined range. The data element is one of the plurality of data elements. The random value is one of the plurality of random values. The rank of the random value is part of the ranking.

At operation 925, the data selection system (or a component or subsystem thereof) is configured to, and can, generate and/or output a randomization scheme that includes the ranking and the predetermined proportion. A second selection of a second subset of the plurality of data elements is based on the randomization scheme. Examples of the randomization scheme of operation 925 include the randomization scheme(s) 125, a randomization scheme that includes elements of the table diagram 400 (e.g., the amount of the data elements 405 in the batch, the random values 410, the rankings 415, and/or a threshold (8) to compare the rankings 415 to in order to make the selections 420), the randomization scheme 512, the randomization scheme 522, the randomization scheme 532, a randomization scheme with the batch size 610 and/or the thresholds 615, a randomization scheme generated based on the UI 710 and used to make the randomized selection shown in the UI 720, and/or the randomization scheme(s) 835. Examples of the selection of the subset of operation 920, and/or of the second selection of the second subset of operation 925, include the selection(s) 135, selection(s) 145, selection(s) 155, selection(s) 165, selections 420, selections 515, selections 525, selections 535, selection(s) based on the randomization scheme(s) 835, or a combination thereof.

In some aspects, the data selection system (or a component or subsystem thereof) is configured to, and can, send an instruction configured to cause the second selection of the second subset of the plurality of data elements based on the randomization scheme. For instance, the instruction can be an instruction from the special-purpose leader computer system(s) 110 to the special-purpose follower computer systems (e.g., special-purpose follower computer system(s) 130, special-purpose follower computer system(s) 140, special-purpose follower computer system(s) 150, and/or special-purpose follower computer system(s) 160) to implement the randomization scheme(s) 125.

At operation 930, the data selection system (or a component or subsystem thereof) is configured to, and can, output an indication of the subset and the second subset. Examples of the indication include the UI 720 or a UI, alert, or notification that identifies or includes any indication of any of the selection(s) 135, selection(s) 145, selection(s) 155, selection(s) 165, selections 420, selections 515, selections 525, selections 535, selection(s) based on the randomization scheme(s) 835, or a combination thereof.

In some aspects, the data selection system (or a component or subsystem thereof) is configured to, and can, select a third subset of a second plurality of data elements using the plurality of random values and the ranking. Examples of the selection of the third subset include the selection(s) 135, selection(s) 145, selection(s) 155, selection(s) 165, selections 420, selections 515, selections 525, selections 535, selection(s) based on the randomization scheme(s) 835, or a combination thereof.

In some aspects, the data selection system (or a component or subsystem thereof) is configured to, and can, select the plurality of data elements as a first batch from the dataset dynamically as the dataset continues to be received (e.g., where the dataset is a data stream as in the data stream 505). The data selection system can select a second plurality of data elements as a second batch from the dataset. The first batch and the second batch share a batch size. Examples of the batches include a batch with a batch size having the number of data elements 405, the batch 510, the batch 520, the batch 530, a batch with a batch size 610, a batch size determined in any of the randomization schemes discussed herein, another batch discusses herein, or a combination thereof. In some examples, the data selection system can select a subset of the second plurality of data elements based on the ranking of the plurality of random values. In some examples, the data selection system can select the subset of the second plurality of data elements based on a second ranking of a second plurality of random values. The indication (of operation 930) is indicative of a combination of the subset of the plurality of data elements and the subset of the second plurality of data elements.

The process 900, and the data selection system that performs it, may provide a number of technical improvements. For instance, the process 900, and the data selection system that performs it may allow a desired proportion to be enforced while remaining true randomness of in the selection process, is fast and efficient, is process-agnostic, is access-agnostic, and scales horizontally.

In some examples, the processes described herein may be performed by a computing device or apparatus. The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein are illustrated as logical flow diagrams, block diagrams, or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
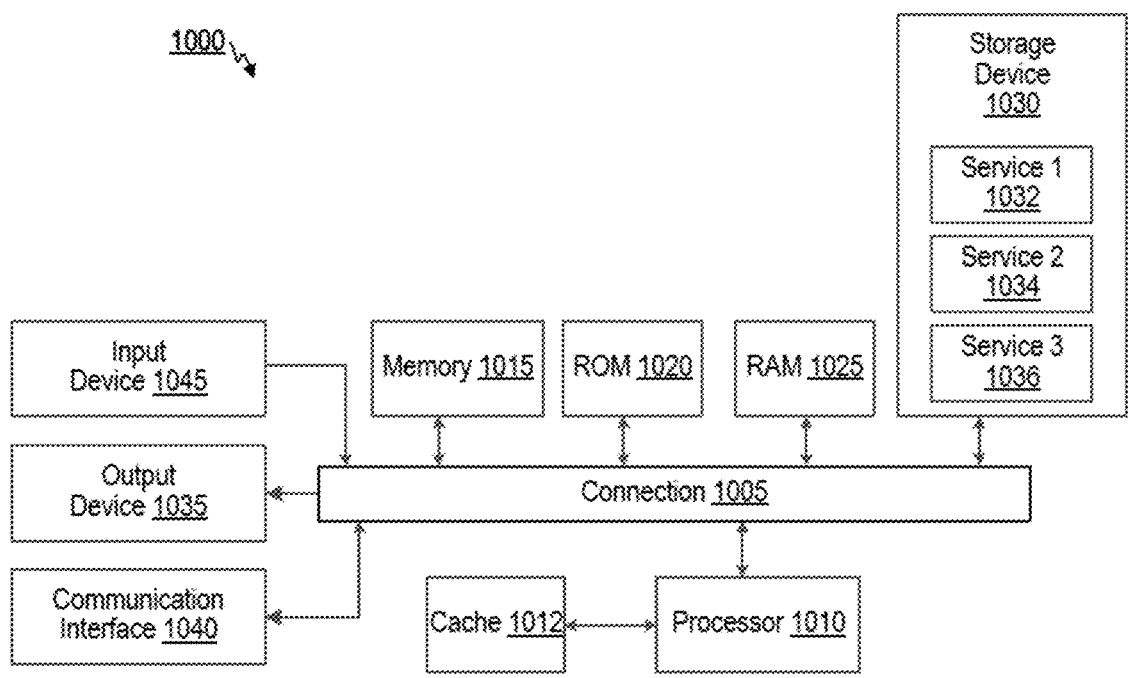
FIG. 10 is a diagram illustrating an example of a computing system for implementing certain aspects described herein, in accordance with some examples.

FIG. 10 is a diagram illustrating an example of a system for implementing certain aspects of the present technology. In particular, FIG. 10 illustrates an example of computing system 1000, which can be for example any computing device making up internal computing system, a remote computing system, a camera, or any component thereof in which the components of the system are in communication with each other using connection 1005. Connection 1005 can be a physical connection using a bus, or a direct connection into processor 1010, such as in a chipset architecture. Connection 1005 can also be a virtual connection, networked connection, or logical connection.

In some aspects, computing system 1000 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache 1012 of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 1002.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1030 can include software services, servers, services, etc., that when the code that defines such software is executed by the processor 1010, it causes the system to perform a function. In some aspects, a hardware service that performs a particular function can include the software component stored in a computer-readable medium in connection with the necessary hardware components, such as processor 1010, connection 1005, output device 1035, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method for scalable data selection according to an enforced randomization scheme, the method comprising:
receiving a dataset with a plurality of data elements;
generating a plurality of random values;
generating a ranking of the plurality of random values;
selecting a subset of the plurality of data elements based on a comparison between the ranking and a predetermined threshold, wherein the predetermined threshold is based on a predetermined proportion of the plurality of data elements to be included in the subset;
outputting a randomization scheme that includes the ranking and the predetermined proportion, wherein a second selection of a second subset of the plurality of data elements is based on the randomization scheme; and
outputting an indication of the subset and the second subset.

2. The method of claim 1, wherein the plurality of random values are a plurality of random numbers.

3. The method of claim 1, wherein the plurality of random values are a plurality of random characters.

4. The method of claim 1, further comprising:
selecting a third subset of a second plurality of data elements using the plurality of random values and the ranking.

5. The method of claim 1, further comprising:
sending an instruction configured to cause the second selection of the second subset of the plurality of data elements based on the randomization scheme.

6. The method of claim 1, further comprising:
selecting the plurality of data elements as a first batch from the dataset dynamically as the dataset continues to be received;
selecting a second plurality of data elements as a second batch from the dataset, wherein the first batch and the second batch share a batch size; and
selecting a subset of the second plurality of data elements based on the ranking of the plurality of random values, wherein the indication is indicative of a combination of the subset of the plurality of data elements and the subset of the second plurality of data elements.

7. The method of claim 1, further comprising:
selecting the plurality of data elements as a first batch from the dataset dynamically as the dataset continues to be received;
selecting a second plurality of data elements as a second batch from the dataset, wherein the first batch and the second batch share a batch size; and
selecting a subset of the second plurality of data elements based on a second ranking of a second plurality of random values, wherein the indication is indicative of a combination of the subset of the plurality of data elements and the subset of the second plurality of data elements.

8. The method of claim 1, wherein selecting the subset of the plurality of data elements based on the comparison includes identifying whether a rank of a random value exceeds the predetermined threshold, wherein a data element corresponding to the random value is included in the selection based on whether the rank of the random value exceeds the predetermined threshold, wherein the data element is one of the plurality of data elements, wherein the random value is one of the plurality of random values, and wherein the rank of the random value is part of the ranking.

9. The method of claim 1, wherein the comparison between the ranking and the predetermined threshold is a comparison between the ranking and a predetermined range, wherein the predetermined range spans between the predetermined threshold and a second threshold.

10. The method of claim 9, wherein selecting the subset of the plurality of data elements based on the comparison includes identifying whether a rank of a random value falls within the predetermined range, wherein a data element corresponding to the random value is included in the selection based on whether the rank of the random value falls within the predetermined range, wherein the data element is one of the plurality of data elements, wherein the random value is one of the plurality of random values, and wherein the rank of the random value is part of the ranking.

11. A system for scalable data selection according to an enforced randomization scheme, the system comprising:
at least one memory storing instructions; and
at least one processor, wherein execution of the instructions by the at least one processor causes the at least one processor to:
receive a dataset with a plurality of data elements;
generate a plurality of random values;
generate a ranking of the plurality of random values;
select a subset of the plurality of data elements based on a comparison between the ranking and a predetermined threshold, wherein the predetermined threshold is based on a predetermined proportion of the plurality of data elements to be included in the subset;
output a randomization scheme that includes the ranking and the predetermined proportion, wherein a second selection of a second subset of the plurality of data elements is based on the randomization scheme; and
output an indication of the subset and the second subset.

12. The system of claim 11, wherein the plurality of random values are a plurality of random numbers.

13. The system of claim 11, wherein the plurality of random values are a plurality of random characters.

14. The system of claim 11, wherein the execution of the instructions by the at least one processor causes the at least one processor to:
select a third subset of a second plurality of data elements using the plurality of random values and the ranking.

15. The system of claim 11, wherein the execution of the instructions by the at least one processor causes the at least one processor to:
send an instruction configured to cause the second selection of the second subset of the plurality of data elements based on the randomization scheme.

16. The system of claim 11, wherein the execution of the instructions by the at least one processor causes the at least one processor to:
select the plurality of data elements as a first batch from the dataset dynamically as the dataset continues to be received;
select a second plurality of data elements as a second batch from the dataset, wherein the first batch and the second batch share a batch size; and
select a subset of the second plurality of data elements based on the ranking of the plurality of random values, wherein the indication is indicative of a combination of the subset of the plurality of data elements and the subset of the second plurality of data elements.

17. The system of claim 11, wherein the execution of the instructions by the at least one processor causes the at least one processor to:
select the plurality of data elements as a first batch from the dataset dynamically as the dataset continues to be received;
select a second plurality of data elements as a second batch from the dataset, wherein the first batch and the second batch share a batch size; and
select a subset of the second plurality of data elements based on a second ranking of a second plurality of random values, wherein the indication is indicative of a combination of the subset of the plurality of data elements and the subset of the second plurality of data elements.

18. The system of claim 11, wherein selecting the subset of the plurality of data elements based on the comparison includes identifying whether a rank of a random value exceeds the predetermined threshold, wherein a data element corresponding to the random value is included in the selection based on whether the rank of the random value exceeds the predetermined threshold, wherein the data element is one of the plurality of data elements, wherein the random value is one of the plurality of random values, and wherein the rank of the random value is part of the ranking.

19. The system of claim 11, wherein the comparison between the ranking and the predetermined threshold is a comparison between the ranking and a predetermined range, wherein the predetermined range spans between the predetermined threshold and a second threshold.

20. The system of claim 19, wherein selecting the subset of the plurality of data elements based on the comparison includes identifying whether a rank of a random value falls within the predetermined range, wherein a data element corresponding to the random value is included in the selection based on whether the rank of the random value falls within the predetermined range, wherein the data element is one of the plurality of data elements, wherein the random value is one of the plurality of random values, and wherein the rank of the random value is part of the ranking.

21. A non-transitory computer readable storage medium having embodied thereon a program, wherein the program is executable by a processor to perform a method of scalable data selection according to an enforced randomization scheme, the method comprising:
receiving a dataset with a plurality of data elements;
generating a plurality of random values;
generating a ranking of the plurality of random values;
selecting a subset of the plurality of data elements based on a comparison between the ranking and a predetermined threshold, wherein the predetermined threshold is based on a predetermined proportion of the plurality of data elements to be included in the subset;
outputting a randomization scheme that includes the ranking and the predetermined proportion, wherein a second selection of a second subset of the plurality of data elements is based on the randomization scheme; and
outputting an indication of the subset and the second subset.

22. The non-transitory computer readable storage medium of claim 21, wherein the plurality of random values are a plurality of random numbers.

23. The non-transitory computer readable storage medium of claim 21, wherein the plurality of random values are a plurality of random characters.

24. The non-transitory computer readable storage medium of claim 21, further comprising:
selecting a third subset of a second plurality of data elements using the plurality of random values and the ranking.

25. The non-transitory computer readable storage medium of claim 21, further comprising:
sending an instruction configured to cause the second selection of the second subset of the plurality of data elements based on the randomization scheme.

26. The non-transitory computer readable storage medium of claim 21, further comprising:
selecting the plurality of data elements as a first batch from the dataset dynamically as the dataset continues to be received;

selecting a second plurality of data elements as a second batch from the dataset, wherein the first batch and the second batch share a batch size; and selecting a subset of the second plurality of data elements based on the ranking of the plurality of random values, wherein the indication is indicative of a combination of the subset of the plurality of data elements and the subset of the second plurality of data elements.

27. The non-transitory computer readable storage medium of claim 21, further comprising:

selecting the plurality of data elements as a first batch from the dataset dynamically as the dataset continues to be received;

selecting a second plurality of data elements as a second batch from the dataset, wherein the first batch and the second batch share a batch size; and selecting a subset of the second plurality of data elements based on a second ranking of a second plurality of random values, wherein the indication is indicative of a combination of the subset of the plurality of data elements and the subset of the second plurality of data elements.

28. The non-transitory computer readable storage medium of claim 21, wherein selecting the subset of the plurality of data elements based on the comparison includes identifying whether a rank of a random value exceeds the predetermined threshold, wherein a data element corresponding to the random value is included in the selection based on whether the rank of the random value exceeds the predetermined threshold, wherein the data element is one of the plurality of data elements, wherein the random value is one of the plurality of random values, and wherein the rank of the random value is part of the ranking.

29. The non-transitory computer readable storage medium of claim 21, wherein the comparison between the ranking and the predetermined threshold is a comparison between the ranking and a predetermined range, wherein the predetermined range spans between the predetermined threshold and a second threshold.

30. The non-transitory computer readable storage medium of claim 29, wherein selecting the subset of the plurality of data elements based on the comparison includes identifying whether a rank of a random value falls within the predetermined range, wherein a data element corresponding to the random value is included in the selection based on whether the rank of the random value falls within the predetermined range, wherein the data element is one of the plurality of data elements, wherein the random value is one of the plurality of random values, and wherein the rank of the random value is part of the ranking.

\* \* \* \* \*